INVENTORS
ANDRE R. BRAULT
ANWAR K. CHITAYAT
BY

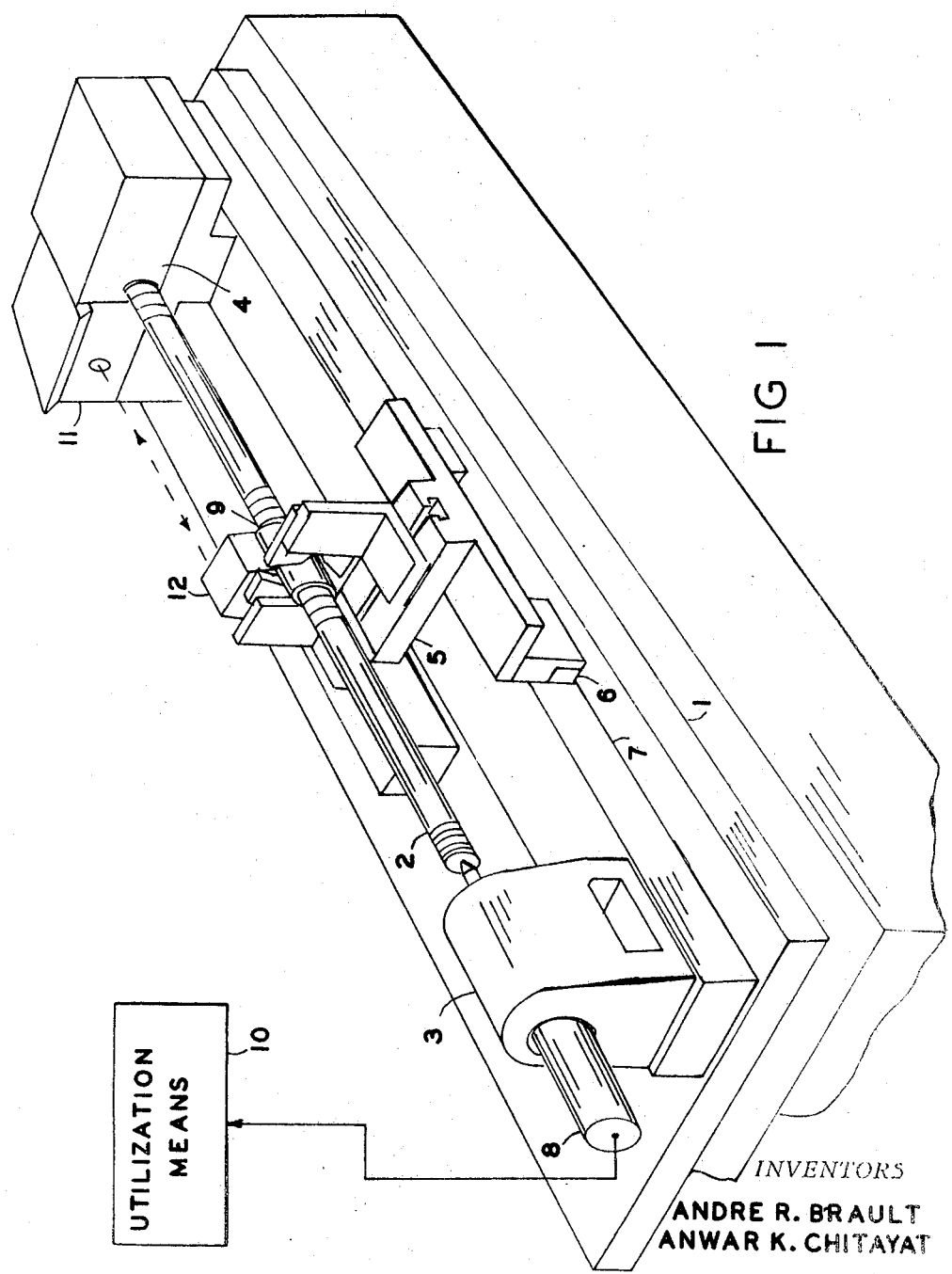

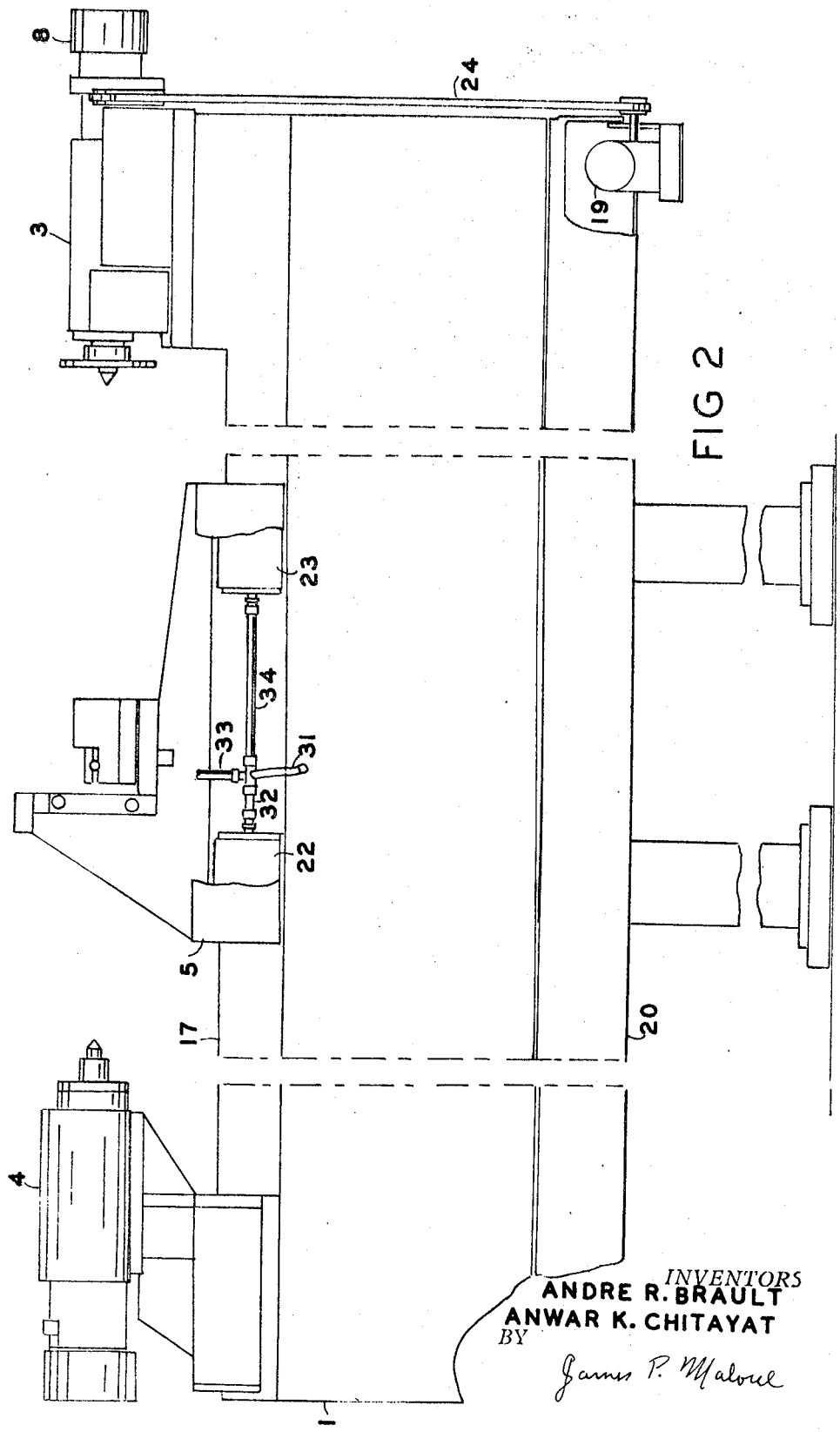

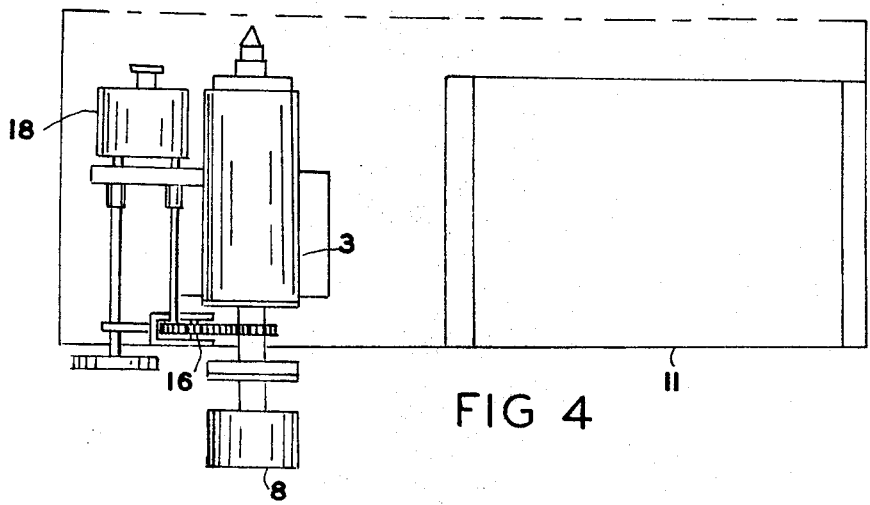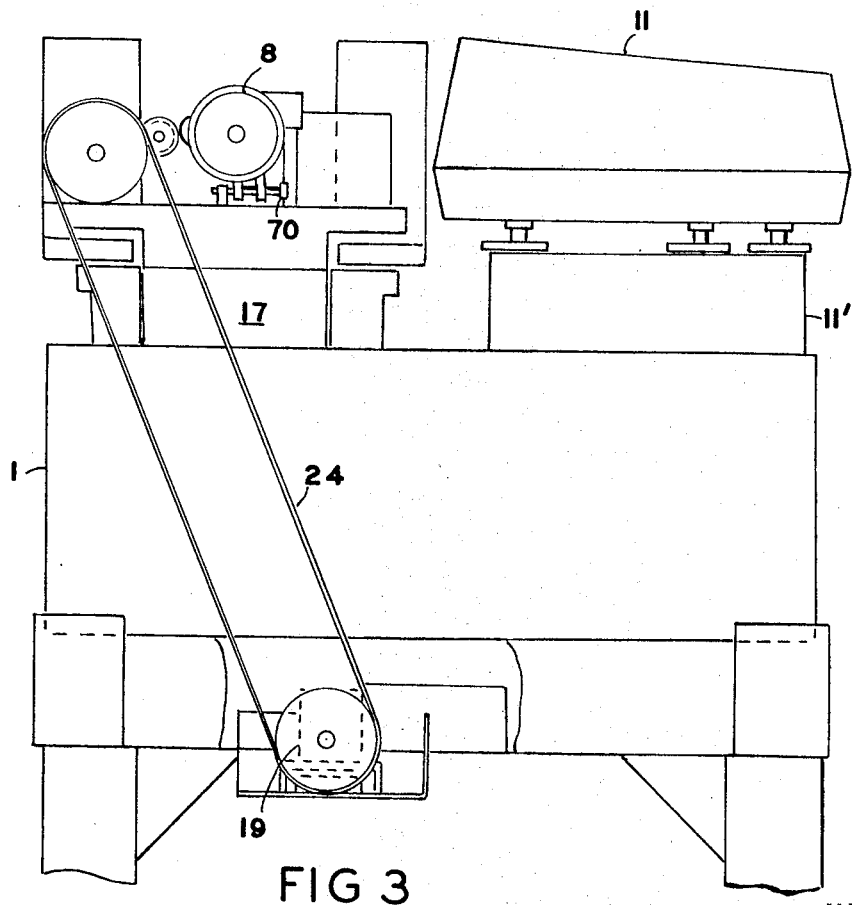

June 2, 1970     A. R. BRAULT ET AL     3,515,481
LEAD SCREW MEASURING MEANS
Filed Sept. 9, 1966     6 Sheets-Sheet 5
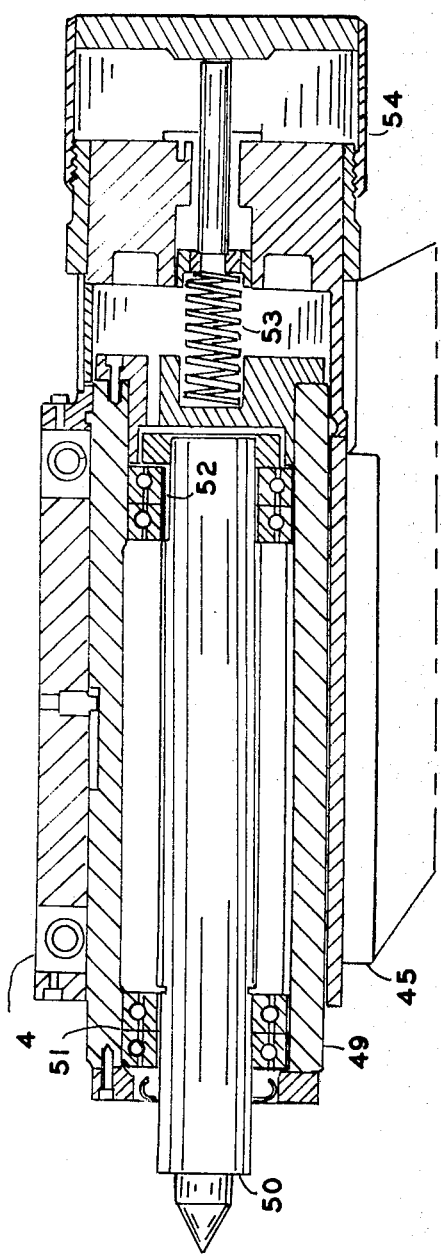
FIG 7
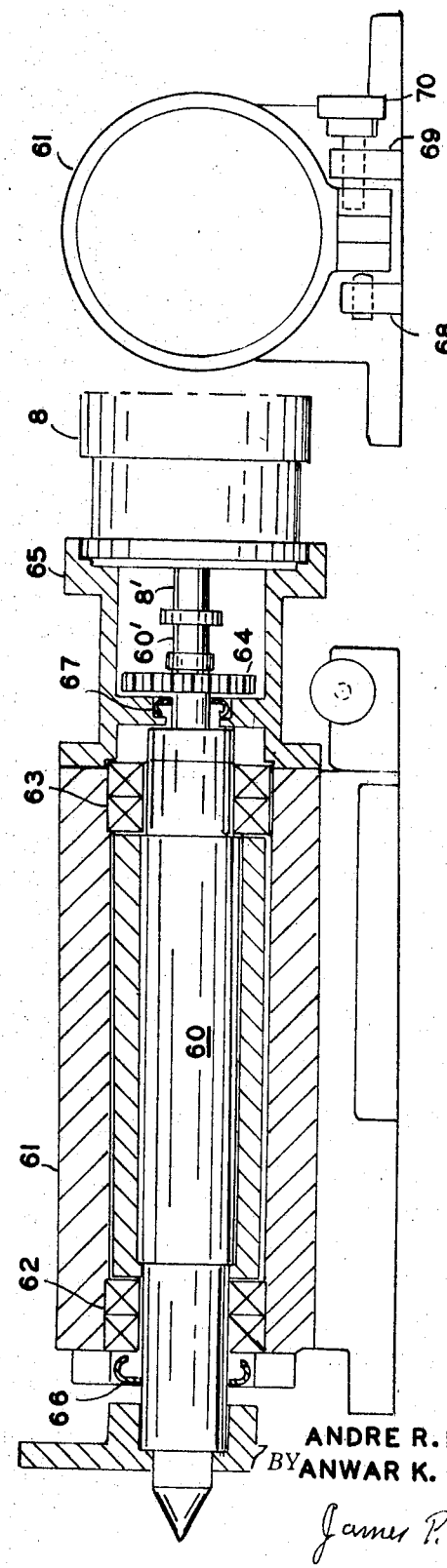
FIG 8
FIG 8A
INVENTORS
ANDRE R. BRAULT
ANWAR K. CHITAYAT
BY
*James P. Mulvee*

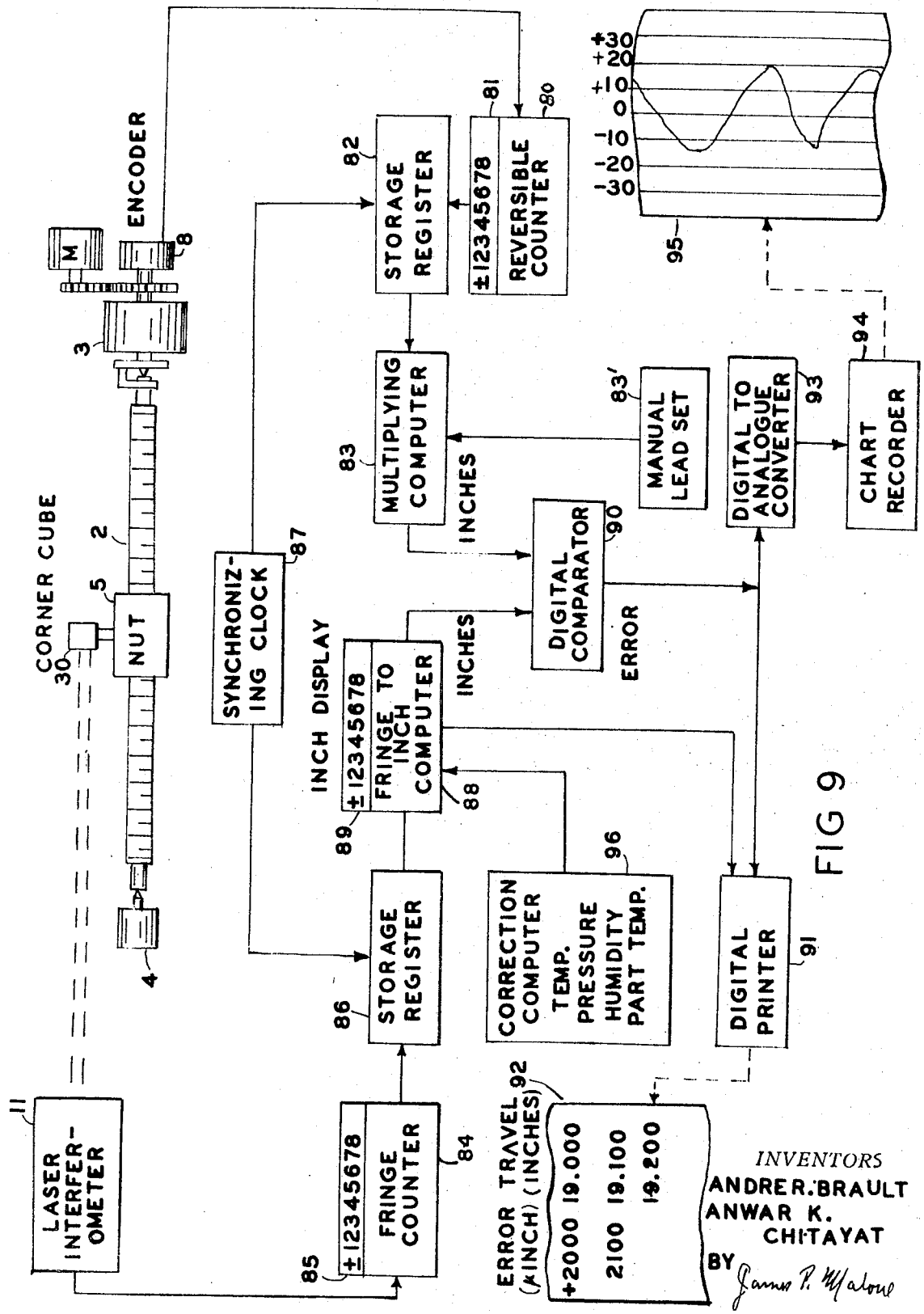

United States Patent Office

3,515,481
Patented June 2, 1970

3,515,481
LEAD SCREW MEASURING MEANS
Andre R. Brault, North Merrick, and Anwar K. Chitayat, Plainview, N.Y., assignors to OPTOmechanisms, Inc., Plainview, N.Y.
Filed Sept. 9, 1966, Ser. No. 578,201
Int. Cl. G01n *21/00*
U.S. Cl. 356—73       4 Claims

ABSTRACT OF THE DISCLOSURE

A lead screw to be tested is rotatably mounted by a headstock and a tailstock. A traveling carriage is mounted on air bearings. The carriage is connected to be driven by and parallel to the rotatably mounted lead screw by means of a nut or other means such as a probe or quill type follower. The carriage movement is measured by an interferometer.

A rotary type encoder is connected to the headstock and is adapted to transmit signals proportional to the rotation of the lead screw. The interferometer measured longitudinal travel is compared with the rotational movement after the rotational movement had been converted to longitudinal lead data and any variation of lead is measured in millionths of an inch. The comparison information may be automatically plotted or incorporated in a tape for the automatic correction of the errors in the lead screw.

This invention relates to means for measuring and checking precision lead screws.

More particularly, the invention relates to means for checking the lead of lead screws with interferometer means. The invention may also be used as a linear standard for measuring other work pieces with an accuracy of micro-inches.

An embodiment of the invention generally comprises a base which may be a solid granite block which is highly stable, keeping its shape over extended periods. The lead screw to be tested is rotatably mounted by a headstock and a tailstock. The headstock is adapted to be driven, as will be described.

A traveling carriage is mounted on air bearings. The carriage rides on a rail which is preferably of granite or other temperature insensitive materials. The air bearings are located at the bottom and interior sides of the carriage so that the carriage rides on a film of air on top of the base and along the sides of the rail. The carriage is connected to the rotatably mounted lead screw by means of a nut or other means such as a probe or quill type follower.

A rotary type encoder is connected to the headstock and is adapted to transmit signals proportional to the angular position of the lead screw. The encoder may be one of the types commercially available which transmit a series of pulses indicative of the degree of input shaft rotation. The output of the encoder may be fed to utilization means which may indicate degrees of rotation. Alternatively, the information may be fed to various data processing, comparing, and computing devices so that the rotation information may be converted to desired or predicted travel and compared with or related to the actual cumulative or net longitudinal lead travel as will be described.

In this particuar application, the net longitudinal travel is compared with the rotational movement after the rotational movement had been converted to predicted cumulative longitudinal lead data and any variation of lead is measured in millionths of an inch.

The comparison information may be automatically plotted or incorporated in a tape for the automatic correction of the errors in the lead screw.

The carriage may also mount independent viewing and measuring devices such as a microscope which might be used in conjunction with the interferometer to make measurements on any work piece laid on top of the base. A reference straight edge rail is preferably mounted on the base in order to align various work pieces which might be for instance, gauge blocks or other work pieces having requirement for precision measurement. Temperature, pressure and humidity correction may be inserted if desired.

Accordingly, a principal object of the invention is to provide new and improved lead screw checking means.

Another object of the invention is to provide new and improved lead screw checking means using interferometer measuring means.

Another object of the invention is to provide new and improved linear measuring apparatus utilizing interferometer measuring means.

Another object of the invention is to provide new and improved means for measuring the lead of the lead screws having means to rotatably mount the lead screw, means to compute information proportional to the predicted cumulative lead of the screw and traveling carriage means adapted to measure actual cumulative longitudinal lead travel, the latter including interferometer means adapted to measure the net longitudinal travel of the carriage, means to compare the rotation information with the actual cumulative longitudinal information to detect errors in the lead screw and utilization means connected to said information detecting means.

Another object of the invention is to provide new and improved lead screw measuring means comprising a stable base, means to rotatably mount a test lead screw on said base comprising a headstock mounted adjacent to one end of said base, a tailstock mounted adjacent to the other end of said base, said headstock and tailstock being adapted to rotatably mount said test lead screw, a traveling carriage and anti-friction means adapted to mount said carriage on said base for movement parallel to said lead screw and to support said lead screw.

Another object of the invention is to provide new and improved lead screw checking means which are adapted to be corrected for temperature, pressure and humidity variations.

These and other objects of the invention will become apparent from the following specification and drawings of which:

FIG. 1 is a perspective view of an embodiment of the invention.

FIG. 2 is a rear view of the embodiment of FIG. 1.

FIG. 3 is a side view of the embodiment of FIG. 2.

FIG. 4 is a partial top view of the embodiment of FIGS. 2 and 3.

FIG. 7 is a detail view of the tailstock assembly.

FIGS. 8 and 8A are detail views of the headstock assembly.

FIG. 9 is a schematic electrical diagram illustrating the use of the invention.

Figure 6C:
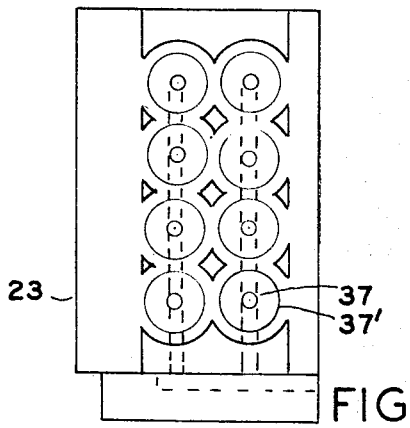
FIGS. 6A–6C are detail views of the air bearing assembly for the carriage.

Referring to FIG. 1, the invention generally comprises a base 1, which is preferably a thick solid granite block or other material which is highly stable with time. The lead screw 2, to be tested, is rotatably mounted by a headstock 3 and a tailstock 4. The headstock 3 is driven as will be described.

A traveling carriage 5 is mounted on air bearings 6 and corresponding bearings on the other side of the carriage. The carriage rides on a rail 7 which is preferably of granite or other temperature insensitive material. The air bearings are located at the bottom and interior sides of the carriage so that the carriage rides on films of air on top of the base 1 and along the sides of the rail 7. The carriage is connected to the rotatably mounted lead screw 2 by means of a nut 9 or other means such as a probe or quill type follower.

A rotary type encoder 8 is connected to the headstock 3 and is adapted to transmit signals proportional to the rotation angle of the lead screw. The encoder may be one of the types commercially available which transmit a series of pulses proportionally to input shaft rotation angle. The output of the encoder 8 may be fed to utilization means 10 which may indicate small fractions of degrees of rotation. Alternatively, the information may be fed to various data processing, comparing and computing devices so that the rotation screw angle information may be converted to predicted or desired travel compared with or related to the actual longitudinal lead travel as will be described.

The longitudinal travel of the carriage is measured by means of an interferometer 11 and is mounted on one side of the base 1. The interferometer may be a laser interferometer such as shown in copending application, Ser. No. 483,486, filed Aug. 30, 1965, entitled: Single and Double Beam Interferometer Means.

The interferometer projects a beam which impinges on a reflector 12, mounted on the carriage which reflects the beam back to the interferometer. The interferometer is preferably of the type which is adapted to automatically count the fringes and feed the information to a utilization device such as means to convert the fringe formation to inches and to indicators or other data processing or computing devices.

In this particular application, the longitudinal travel is compared with the rotational movement after the rotational movement had been converted to longitudinal lead information. Any variation of lead in the lead screw is measured in millionths of an inch.

The comparison information may be automatically plotted or incorporated in a tape for the automatic correction of the errors in the lead screw.

The carriage may also mount independent viewing and measuring devices such as a microscope and associate spot light which might be used in conjunction with the interferometer to make any measurement in any work piece laid on top of the base 1. A reference straight edge rail is preferably mounted on the base in order to align various work pieces which might be for instance, gauge blocks or other work pieces having requirements for precision measurement.

FIGS. 2, 3 and 4 show rear, side and top views of the embodiment of FIG. 1 showing the base 1 which is preferably mounted on a supporting table 20 by means of shock mounts. The carriage 5 rides on the rail 17 with little or no friction because of the air bearing blocks 22 and 23 which provide air pressure through apertures on the side of the air bearing blocks adjacent the top of the block 1 and the sides of the rail 17. Another pair of bearing blocks are mounted on the other side of the carriage. The headstock 3 is fixedly mounted to the base 1. The rotary encoder 8 is mounted on the head stock 3 and the headstock is adapted to be rotatably driven by means of the belt 24 which is connected to a motor 19. The belt is connected to the headstock 3 by means of a variable speed transmission 18 (FIG. 4) and adjustable gearing 16. Adjustment of the headstock may be made by knob 70.

The tailstock is similarly mounted on the base. The laser interferometer 11 is mounted on a pedestal 11'.

Figure 6B:
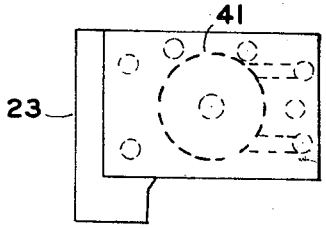
Figure 6A:
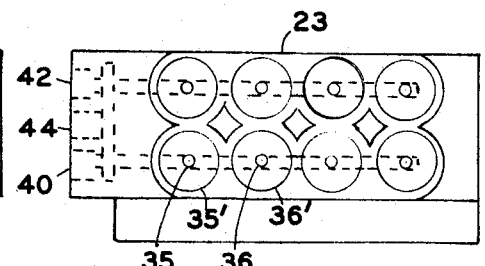

Air pressure is applied to the air bearing blocks 22, 23, etc. by means of the flexible tube 31 and connecting pipes 32, 33, 34, etc. which are mounted on the carriage. Details of the air bearing blocks are shown in FIGS. 6A–6C.

Figure 5A:
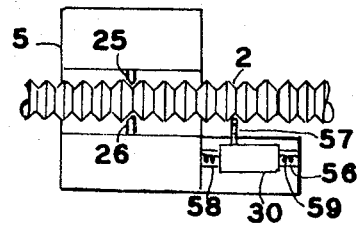
FIG. 5A is a detail view of a modification of the invention.
Figure 5:
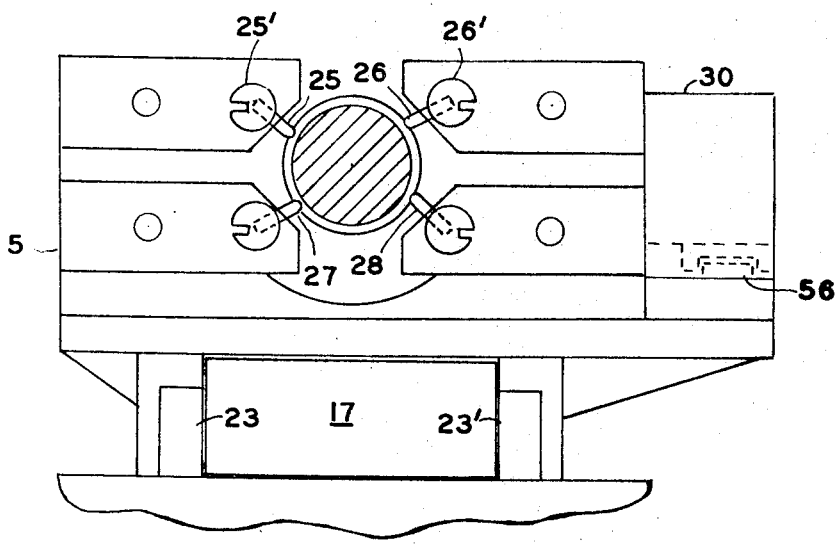
FIG. 5 is a detail view of the carriage partially in section.

FIG. 5 shows a detail view of the carriage member showing the method of connecting followers to the lead screw. The follower may comprise pins or probes 25, 26, 27, 28, which are mounted in holding brackets 25', 26', etc. which are mounted on the carriage 5. Instead of the probe followers, a nut may be used to connect the carriage to lead screw. However, the nut is not as accurate for some purposes since it tends to average out the errors of the lead screw over a number of threads. The corner cube reflector 30 is fixedly mounted on the carriage along the axis of the laser or interferometer beam.

Due to the operation of the air bearings 23, 23', etc. there is little or no friction load on the carriage so that the rotation of the lead screw can advance the carriage without any distortion force placed on the lead screw.

The corner cube 30 may be fixedly mounted on the air bearing table or the corner cube may be slidably mounted, as illustrated in FIGURE 5A, on track 56 and spring loaded to the air bearing table and connected to the screw with its own stylus 57, so that the stylus may be spring loaded against the thread being measured by springs 58 and 59. The stylus may be spring loaded against the left hand side of the thread or the right hand side of the thread by using only one of the springs or centered in the thread by using both springs.

Referring to FIGS. 6A through 6C, there is shown the detail construction of the air bearing blocks 23, etc. The blocks have a plurality of apertures 35, 36, 37, etc. each of which is surrounded by countersinks 35', 36', 37'. The purpose of the countersink areas is to permit sufficient lift area to initially lift the contacts off the surface. In other words, if there was only a small aperture and the surface was substantially flat, it would be practically impossible to lift the bearing blocks off the surface. The wells are interconnected so that there is an averaging of pressure.

The blocks have these apertures and countersink areas on the bottom and on one side and all of the apertures are connected through shaftways to ports or openings 40, 44, 42, etc. to which the air pressure is applied. The blocks have a hollow center portion 44 to facilitate the connection of the air pressure to the apertures.

FIG. 7 shows a detail sectional view of the tailstock assembly generally comprising a casing 4 which may be generally round in cross section which is mounted on supporting brackets 45 mounted on the base 1. A needle point spindle 50 is rotatably mounted in a member 49 by means of bearings 51 and 52. The member 49 is slidably mounted in the outer casing 4 and is spring loaded by the spring 53. The compression on the spring may be adjustable by means of adjustment means 54.

FIG. 8 is a view of the headstock. The construction is generally similar to the tailstock of FIG. 7 except the headstock is not spring loaded but has provision for driving gears and for mounting the rotary encoder 8. More specifically, the lead screw is held by the spindle member 60 which is rotatably mounted in the casing 61 by means of bearings 62, 63, etc. There is no spring in the headstock since all the spring force comes from the tailstock. A driving gear or sprocket 64 is fixedly connected to the rotating member 60 and is adapted to be driven by a chain or belt or by suitable gearing. The encoder 8 is clamped to the stationary portion 65 of the casing 61 and the shaft 8' of the encoder 8 is directly coupled to the shaft 60', connected to the rotary member 60. Suitable oil seals 66 and 67 are provided so that the bearings may be filled with oil. The bearings 62, 63 are designed to take the thrust of the spring 53 of the tailstock.

If the lead screw is very long, for instance three or four feet, there may be possible bowing or sagging of the lead screw due to its own weight and also due to the spring loading between headstock and tailstock. This condition is minimized because the connection member between the carriage and the lead screw, which may be a nut, provides vertical support to the lead screw.

Referring to FIGS. 8 and 8A, the casing 61 is adapted to be adjustable by means of the adjustment blocks 68, 69, and the adjustment knob 70 so that the headstock and tailstock may be lined up on a true horizontal axis which is parallel to the axis of movement of the carriage. All of the surfaces are carefully aligned and ground so that the travel of the carriage is a true horizontal direction.

FIG. 9 shows a typical set up for utilizing the invention with appropriate conversion and computer mechanisms, for automatically printing the error in digital form or graph form on tapes. The encoder 8 feeds screw angle information in digital form to the conventional reversible counter 80 which has a display section 81. The output of the counter 80 is fed to a conventional storage device 82, the output of which is fed to output computer 83 to convert the digital information to predicted or correct inches of travel. The output of the interferometer 11 is fed to a conventional fringe counter 84 which may also have a conventional display section 85. The output of the fringe counter is fed to a storage registration device 86. The storage devices 82 and 86 are adapted to be triggered simultaneously by synchronizing clock means 87. The output of the storage device 86 is fed to a fringe to inch computer 88 which may also have a conventional display section 89 which reads in inches. The fringe to inch computer may be a conventional multiplication type device which multiplies the fringe count by a constant to convert the fringes to inches. The multiplier factor for computer 83 is set in by lead set switch 83' which inserts the screw pitch multiplier factor.

The output from computers 88 and 83 may be fed to a conventional digital comparator device 90. The output of comparator 90 is the error in digital form. This output may be fed to a printing device 91 which is adapted to print the error in digital form for instance, plus or minus 2.000 micro inches as illustrated on tape 92. The printing device 91 may also receive information from digital form in the computer 89 and print the net longitudinal travel in inches e.g. illustrated as 19.0000 inches.

If it is desired to have a recording in graph form, the output of computer 90 may be fed to a digital-to-analogue converter 93, the output of which may be fed to a chart recorder 94 for printing an error on the tape 95. All of the above devices may be conventional. The display counters 81, 85 and 89 may be conventional display sections of the so called nixie tube type which provides illuminated numbers.

The display sections are preferably provided with a switch so that one or more switches can be turned on or off if desired, to avoid operator confusion.

If desired, the multiplication factor of the fringe to inch computer may be varied by a compensation factor proportional to variation of one or more temperature, pressure, humidity or temperature of the part by correction computer means 96, which may be as shown in copending application, Ser. No. 594,213, for Environmental Correction Computer, filed Nov. 14, 1966.

We claim:
1. Lead screw measuring means comprising a temperature stable base, a lead screw,
   means mounting said test lead screw on said base comprising a head stock and tail stock mounted on said base,
   said head stock and tail stock being adapted to rotatably mount said lead screw,
   drive means coupled to said lead screw for rotating same,
   angle measuring means connected to be responsive to the angle of said lead screw independent of the angular position of said drive means,
   said angle measuring means including an encoder directly connected to said screw for supplying electrical signals indicative of degrees of rotation,
   storage means connected to respond to said electrical signals for generating an integrated electrical signal representing cumulative rotation of said screw including rotations of less than and in excess of one revolution of said screw,
   indicator means responsive to said angle measuring means for displaying data related to the total angular displacement of said screw,
   pitch lead set means connected to modify said electrical signals for generating an electrical pitch signal adjustable to a value representing required screw pitch, means for combining said screw pitch signal with said stored electrical signal to compute a signal indicative of cumulative desired travel of said screw,
   a screw follower adapted to engage said lead screw thread and to be displaced linearly in response to rotation of said screw,
   laser interferometer means optically coupled to said follower for supplying electrical pulses as said follower is displaced,
   travel storage means for storing the output of said interferometer to derive a signal indicative of cumulative actual displacement of said follower,
   and comparator means responsive to the signals representing cumulative actual displacement and cumulative predicted displacement for deriving an error signal related to errors in said lead screw.

2. Apparatus as defined in claim 1 including a correction computer responsive to ambient conditions for producing a corrective electrical signal, and means responsive to said correction computer for modifying said cumulative actual displacement signal.

3. Apparatus as in claim 1 wherein said angle measuring means comprise a source of adjustable electrical signals representing a screw pitch factor and means for multiplying said pitch factor signal and said cumulative rotation signal, including respective storage means for storing said cumulative rotation signal and said cumulative actual displacement signal and a synchronizing means connected to said storage means for coordinating the comparison of said actual displacement signal and the predicted displacement signal, and including a correction computer responsive to ambient conditions for producing a corrective electrical signal, and means responsive to said correction computer for modifying said cumulative actual displacement signal.

4. Apparatus as in claim 1 including respective storage means for storing said cumulative rotation signal and said cumulative actual displacement signal and a synchronizing means connected to said storage means for coordinating the comparison of said actual displacement signal and the predicted displacement signal, and including a correction computer responsive to ambient conditions for producing a corrective electrical signal, and means responsive to said correction computer for modifying said cumulative actual displacement signal.

References Cited

UNITED STATES PATENTS

| | | |
|---|---|---|
| 2,666,267 | 1/1954 | Root. |
| 2,806,293 | 9/1957 | James et al. |
| 2,948,152 | 8/1960 | Meyer. |
| 3,190,173 | 6/1965 | Pettavel. |

OTHER REFERENCES

Article: "Three Interferometry Systems for Precise Measurements," Laser Focus, vol. 2, No. 1, Jan. 1, 1966, pp. 12–20.

Harrison, George R., and Archer, James E., "Interferometric Calibration of Precision Screws and Control of Ruling Engines," Josa, vol. 41, No. 8, August 1951, pp. 495–503.

RONALD L. WIBERT, Primary Examiner

T. MAJOR, Assistant Examiner